United States Patent [19]

Groutage

[11] 4,324,378
[45] Apr. 13, 1982

[54] HIGH-TORQUE/ACCELERATION STABILIZED SENSOR PLATFORM

[75] Inventor: Frederick D. Groutage, Bonita, Calif.

[73] Assignee: The United States of America as represented by the Secretary of the Navy, Washington, D.C.

[21] Appl. No.: 126,778

[22] Filed: Mar. 3, 1980

[51] Int. Cl.³ .............................................. F16M 11/12
[52] U.S. Cl. ....................................... 248/184; 74/5.22
[58] Field of Search ................. 248/179, 184; 74/5.22, 74/5.42, 5.47; 33/174 TA, 174 TD, 174.1 PT; 343/882

[56] References Cited

U.S. PATENT DOCUMENTS

| | | | |
|---|---|---|---|
| 2,500,048 | 3/1950 | Stoiber | 248/184 |
| 3,527,435 | 9/1970 | Lopp et al. | 248/184 |
| 4,256,279 | 3/1981 | Duel | 248/184 |

*Primary Examiner*—Dave W. Arola
*Attorney, Agent, or Firm*—R. F. Beers; Ervin F. Johnston; Harvey Fendelman

[57] ABSTRACT

A powered gimbal high torque/acceleration stabilized platform including an outer gimbal ring and gimbal torquer and an inner gimbal gear and torque motor. The inner gimbal torque motor is secured to the outer gimbal ring to permit increased weight and volume sensors to be packaged and located at the center of rotation of the gimbal axis.

6 Claims, 3 Drawing Figures

HIGH-TORQUE/ACCELERATION STABILIZED SENSOR PLATFORM

BACKGROUND OF THE INVENTION

The present invention relates generally to the field of gimbal type devices and to the field of devices for providing two orthogonal degrees of freedom to a load device. More particularly, the present invention is related to the field of servo controlled, rate stabilizing platforms for sensor systems which are used for guidance systems such as missile guidance systems and surveillance systems for data/intelligence gathering and target tracking.

Traditionally, stabilized sensor platforms have been very high cost systems due to the fact that they are intricate and complex mechanical structures. Packaging of the sensor system on the stabilized platform is an involved process. Volume and weight restrictions are very costly packaging requirements to meet. Stabilized missile sensors require at least two degrees of freedom of movement (azimuth and elevation). These two degrees of freedom of movement have been accomplished in the past by an inner/outer gimbal arrangement of the stabilized platform.

To maintain tracking accuracies and pointing error tolerances, the inner and outer gimbals of the platform must be precisely located and their movement must be within a given tolerance. Many schemes in the past have been used to configure the inner and outer gimbals to maintain these precision movements. They have all, however, been very high cost configurations and have restricted the weight and volume limitation of the sensor which ultimately is mounted to the platform. The most common scheme on the outer gimbal alignment has been to cut bearing races into the edge of the gimbal itself with recirculating bearings imbedded into the bearing race. Thus the whole outer gimbal in this prior art design is a complex bearing system in itself. The material used to make the outer gimbal in this design has to be of hardened steel to facilitate the bearing races.

Traditionally, moreover, the inner gimbal torque power unit has been mounted on the inner gimbal itself. This has restricted the size of the torque power unit (such as a servomotor) which limited the available torque to drive the inner gimbal. By mounting the torque unit on the inner gimbal, the sensor packaging was restricted because the torquer or torque power unit took up much of the packaging volume around the inner axis of rotation. Proper sensor operation requires the sensor to be located at the axis of rotation.

SUMMARY OF THE INVENTION

The present invention is a servo controlled, rate stabilized sensor platform preferably for use in a missile guidance system or alternatively for surveillance systems. For the missile application, the sensor/rate stabilized platform typically make up the key elements of a missile guidance system for deriving direction of arrival guidance information. The sensor is mounted on the stabilized platform of the present invention in order that missile body motion be decoupled from the line of sight steering commands. Since the stabilized platform motion is decoupled from the missile body motion, the platform motion is an inertial reference of the line of sight rates which are the required guidance commands for missiles employing proportional guidance schemes. The present invention as described below is an inner/outer gimbal configuration which is inexpensive because of the materials and machining techniques that can be used to fabricate the gimbals. Further, in accordance with the present invention the torque unit is removed from the inner gimbal mounting arrangement and located on the outer gimbal such that the critical volume and space around the inner axis of rotation is freed up. Further, precision movement is achieved by allowing the outer gimbal to ride on rollers which mate to an indentation cut into the outer surface of the outer gimbal ring. Therefore, the outer gimbal can be made of softer, less expensive materials which are easier and less costly to machine than the hardened steels required for designs which incorporate bearing races. Also, less tolerance control on the roller surface is required as compared to that required for recirculating ball bearing arrangements in bearing races. This is due to the fact that in a recirculating ball bearing arrangement, the individual ball bearings are only tangent at a minute surface point which requires high, accurate tolerances on these bearing surfaces. The roller concept, however, is different in that the roller is tangent to more surface area on which it is riding. Therefore, the surface that the roller is in contact with does not have to be machined to as close a tolerance as it would if ball bearings were riding on the same surface.

By locating the torque unit for the inner gimbal on the outer gimbal ring as provided in accordance with the present invention, much of the weight is transferred to the outer gimbal. This is important from the standpoint that the inner gimbal torque unit can be much larger when it is located on the outer gimbal as compared to being located on the inner gimbal. Higher torque to inertial ratios can thereby be achieved which in turn lead to higher sensor/load accelerations and improved servo system performance. The torque source for the outer gimbal is fixed to a reference frame and does not move with the outer gimbal as does the inner torque source. Therefore, the outer torque source can be increased in size without paying a penalty to handle the growth and weight on the outer gimbal with the addition of the inner gimbal torque source.

STATEMENT OF THE OBJECTS OF INVENTION

It is the primary object of the present invention to disclose a powered gimbal platform that permits increased weight and volume sensors to be packaged and located at the center of rotation of the gimbal axis.

It is a further object of the present invention to disclose a powered gimbal platform design that obviates the need for bearing races and is consequently less costly and easier to manufacture.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
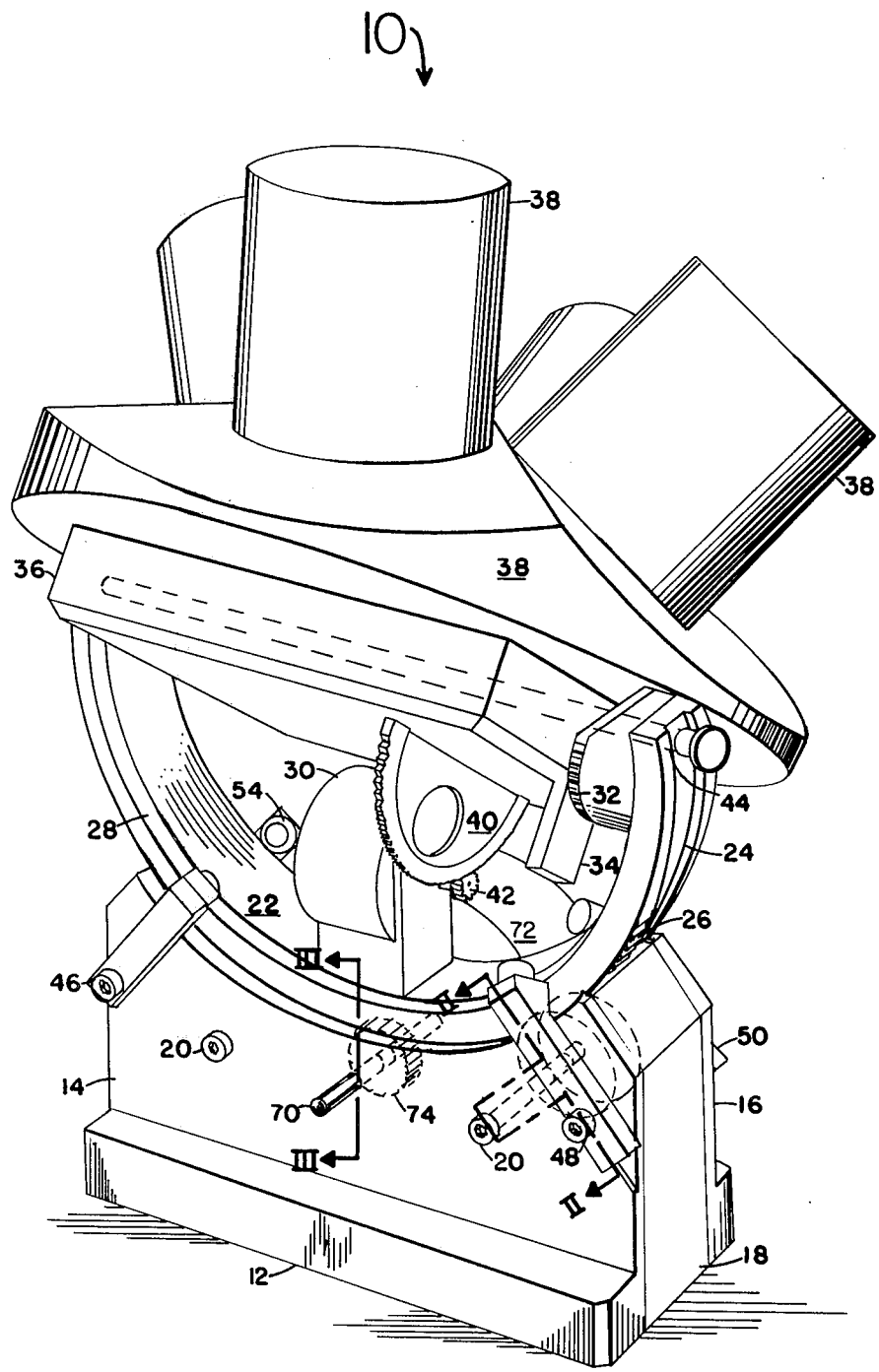
FIG. 1 is a perspective view of the stabilized sensor platform of the present invention illustrating in phantom the thruster tie down and roller units and the outer gimbal drive gear mechanisms.

Referring now to FIG. 1 there will be described in detail the high torque/acceleration stabilized sensor platform of the present invention. The stabilized platform 10 is comprised of an outer gimbal cradle 12 that serves as the base for the inner and outer gimbals of the stabilized platform 10. The cradle assembly 12 is comprised of a front plate 14, a rear plate 16 and side members 18. The cradle assembly 12 may be held together by suitable means such as retaining bolts 20. The gimbal cradle 12 is generally hollow to accommodate the outer gimbal roller support mechanism and gear drive mechanism as will be described in further detail below.

Figure 2:
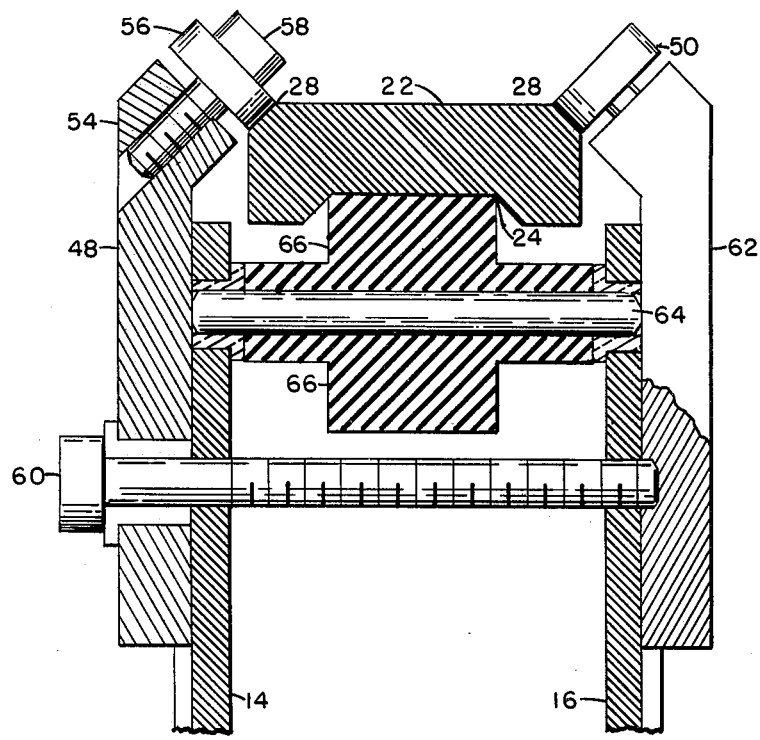
FIG. 2 is a cross-sectional view taken along lines II—II of FIG. 1 illustrating the thruster tie down mechanism.
Figure 3:
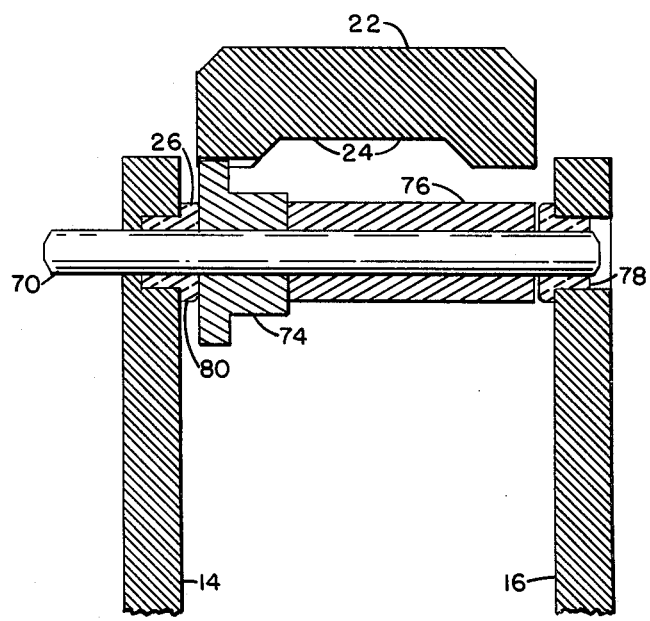
FIG. 3 is a cross-sectional view taken along lines III—III of FIG. 1 illustrating the outer gimbal drive gear mechanism.

Secured to the cradle assembly 12 by a roller and thruster assembly to be described is the outer gimbal ring 22. Referring also to FIGS. 2 and 3 it is seen that the outer gimbal ring is provided with an indentation 24 for contact with the rollers to be described. The outer gimbal ring 22 is of a semicircular configuration and has gear teeth 26 cut into one or both sides of the ring 22. Further, the outer gimbal ring 22 includes the angulated surfaces 28 for contact with the thruster assemblies to be described. Also secured to the outer gimbal ring 22 is the inner gimbal torquer or torque motor 30 which may be secured as by welding or any other suitable attachment method. Also secured to one of the distal ends of the outer gimbal ring 22 is the stationary gear 32 and a potentiometer bracket 34 secured as illustrated for permitting the attachment of a feed back potentiometer. Load platform 36 is connected and secured between the distal ends of the outer gimbal ring 22 as illustrated and serves as the platform for the sensor or other desired load 38.

As seen in FIG. 1 there is mounted on the platform 36 a gear drive 40 which meshes with the gear 42 connected on the output shaft of the inner gimbal torquer 30. The platform 36 and the drive gear 40 are permitted to pivot around the axis of rotation established by pivot rod 44 that extends between the distal ends of the outer gimbal ring 22 through the stationary gear 32 and platform 36.

The outer gimbal ring 22 is held down to the cradle assembly 14 by means of the outer gimbal thruster mechanisms 46, 48, 50 and 54. The details of the thruster mechanism 46, 48, 50 and 52 are shown in FIG. 2 which depicts thruster mechanisms 48 in detail and 50, in part, the four thrusters being substantially identical. The thruster mechanism 48 is comprised of a bearing mount 54 and a ball bearing 56. The ball bearing 56 is secured to the thruster mount 54 by suitable means such as threaded bolt 58. The bearing mount 54 is secured to the cradle assembly 12 by any suitable means such as threaded bolt 60 which extends between the front wall 14 and the rear wall 16 of the cradle assembly 12. The ball bearing assembly 56 abuts against and exerts pressure against the smooth angulated surface 28 of the gimbal ring 22 and thereby holds down the gimbal ring 22. Mounted between the bearing mount 54 and the bearing mount 62 of the thruster 50 is a roller shaft 64 on which is mounted the roller 66. As is seen in FIG. 2 the roller 66 comes into mating contact with the indented roller surface 24 of the outer gimbal ring 22. The outer gimbal ring 22 thus rests on the roller 62 and a similar roller and roller shaft (not shown) mounted between the thruster units 46 and 52.

Referring now to FIG. 3 there is illustrated in cross-section the drive gear mechanism for the outer gimbal ring 22. This drive gear mechanism is comprised of the outer gimbal torquer shaft 70 which is the shaft of torque motor 72 illustrated in FIG. 1. Secured to torquer shaft 70 by suitable means (not shown) is the pinion gear 74 which drives the outer gimbal ring 22 by meshing with the gear teeth 26 on the outer gimbal ring 22. Two pinion drive gears would be used for two sets of gear teeth cut into the ring 22. These two sets of teeth would be on both sides of the indentation 24. Tubular spacer 76 may also be provided to further secure the pinion gear 74 in position. Oilite bushings 78 and 80 are provided for securing the shaft 70 and permitting rotation thereof.

In operation a first degree of freedom is provided by motion of the outer gimbal ring 22 as driven by the torque motor 72 and pinion gear 74. The pinion gear 22 thus rotates about the center of the semicircle formed by the pinion gear 22. The second degree of freedom is provided by rotation of the platform 26 around the pivot rod 44. Motion of the platform 36 around such pivot rod 44 is imparted by the torque motor 30 that is connected in fixed relation to the outer gimbal ring 22 and by the drive gears 42 and 40.

It is thus seen that a high torque/acceleration stabilized gimbal sensor platform has been disclosed in which the inner gimbal torquer has been removed from the inner gimbal itself and is mounted on the outer gimbal ring. Precision movement is thereby maintained by this arrangement. Precision movement is further achieved by allowing the outer gimbal ring 22 to ride on rollers which mate to the indention 42 cut into the outer surface of the gimbal ring 22. The gimbal ring 22 is held secure to the rollers 66 by the hold down thruster mechanisms 46, 48, 50 and 54 thereby avoiding the need for bearing races and specially hardened steel materials.

Obviously many modifications and variations of the present invention are possible in the light of the above teachings. It is therefore to be understood that within the scope of the appended claims the invention may be practiced otherwise than as specifically described.

What is claimed is:

1. A gimbal high torque/acceleration stabilized platform comprising:
    a selectively positionable member for securing a load to said stabilized platform;
    an inner gimbal gear drive mechanically connected to said selectively positionable member for imparting a first degree of freedom to said selectively positionable member;
    a pivot rod operatively engaged with said selectively positionable member for permitting said selectively positionable member to rotate about said pivot rod;
    an outer gimbal ring operatively coupled to said pivot rod for imparting a second degree of freedom to said selectively positionable member;
    a cradle assembly for providing a base for and for engaging said outer gimbal ring; and
    a torque motor secured in fixed relation to said outer gimbal ring and mechanically coupled to said inner gimbal gear drive.

2. The stabilized platform of claim 1 wherein said outer gimbal ring is a semicircular ring having gear teeth on the outer surface thereof.

3. The stabilized platform of claim 2 further comprising:
   a stationary torque source mechanically coupled to said outer gimbal ring.

4. The stabilized platform of claim 2 wherein:
   a portion of said outer surface of said outer gimbal ring is smooth for providing mating contact with a roller; and
   said stabilized platform further comprises roller means secured to said cradle assembly for contacting said smooth surface and for supporting said outer gimbal ring.

5. The stabilized platform of claim 4 further comprising:
   means secured to said cradle assembly and to said outer gimbal ring for maintaining said outer gimbal ring in slideable engagement with said cradle assembly.

6. In a dual gimbal stabilized platform for imparting motion to an object in two degrees of freedom including a first means for coupling to said object and for imparting a first degree of freedom to said object and a second means for coupling to said object and for imparting a second degree of freedom to said object and further wherein said first means includes a first torque motor and said second means includes a ring gear mechanically coupled to a second torque motor, the improvement comprising:
   said first torque motor being secured to said ring gear so as to be stationary with respect to said ring gear.

* * * * *